United States Patent [19]

Stone et al.

[11] Patent Number: 5,130,578
[45] Date of Patent: Jul. 14, 1992

[54] EFFICIENT HIGH SPEED N-WORD COMPARATOR

[75] Inventors: Wade J. Stone; Edwin A. Kelley, both of Los Angeles, Calif.

[73] Assignee: Hughes Aircraft Company, Los Angeles, Calif.

[21] Appl. No.: 444,454

[22] Filed: Nov. 30, 1989

[51] Int. Cl.$^5$ ............................................. H03K 5/22
[52] U.S. Cl. ............................ 307/494; 307/498; 307/467; 307/455
[58] Field of Search ............... 307/494, 498, 350, 351, 307/467, 455, 530

[56] References Cited

U.S. PATENT DOCUMENTS

| | | | |
|---|---|---|---|
| 3,906,212 | 9/1975 | Poguntke | 307/455 |
| 3,984,702 | 10/1976 | Fett | 307/455 |
| 4,001,605 | 1/1977 | Thomas et al. | 307/357 |
| 4,282,515 | 8/1981 | Patterson, III | 307/352 |
| 4,473,759 | 9/1984 | Mahabadi | 307/350 |
| 4,613,771 | 9/1986 | Gal | 307/455 |
| 4,637,003 | 1/1987 | Yokogawa | 307/351 |
| 4,945,316 | 7/1990 | Sebald et al. | 307/353 |
| 4,963,767 | 10/1990 | Sinh | 307/467 |
| 4,965,512 | 10/1990 | Debar et al. | 328/151 |
| 4,970,417 | 11/1990 | Kubota | 307/455 |
| 4,987,326 | 4/1989 | Satoh et al. | 307/455 |

Primary Examiner—Stanley D. Miller
Assistant Examiner—Terry D. Cunningham
Attorney, Agent, or Firm—Leonard A. Alkov; Wanda K. Denson-Low

[57] ABSTRACT

The efficient high-speed N word comparator receives a plurality of digital inputs which are simultaneously compared by conducting a digital to analog conversion on each input signal and comparing the analog signals in a plurality of weighted analog comparators. Each comparator conducts a balance between an associated input signal and the remaining input signals providing an output indication if the associated signal is an extremum value. The outputs of the comparators are then encoded to provide an address of the digital input of the extremum value and to select the input value through a multiplexer. The address and the value are then provided to subsequent circuitry for processing. Simultaneous comparison of all signals provides significantly reduced ripple delay while reducing the requirements for hardware allowing monolithic implementation for a larger plurality of inputs.

10 Claims, 3 Drawing Sheets

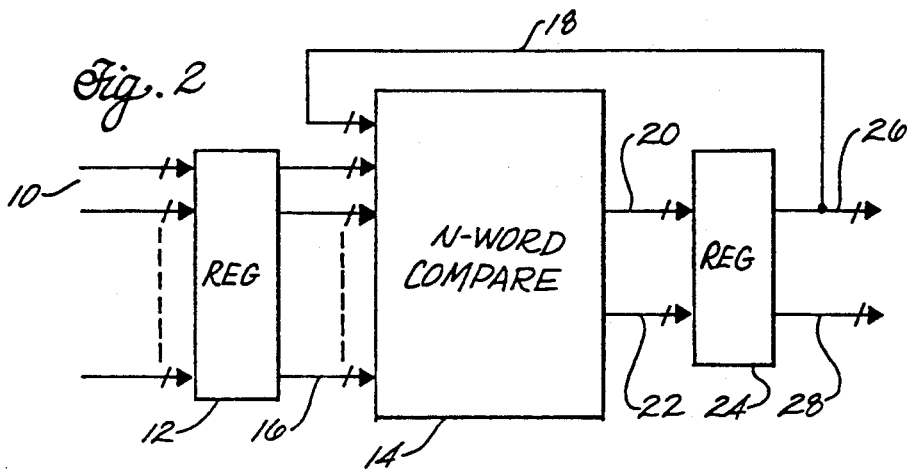
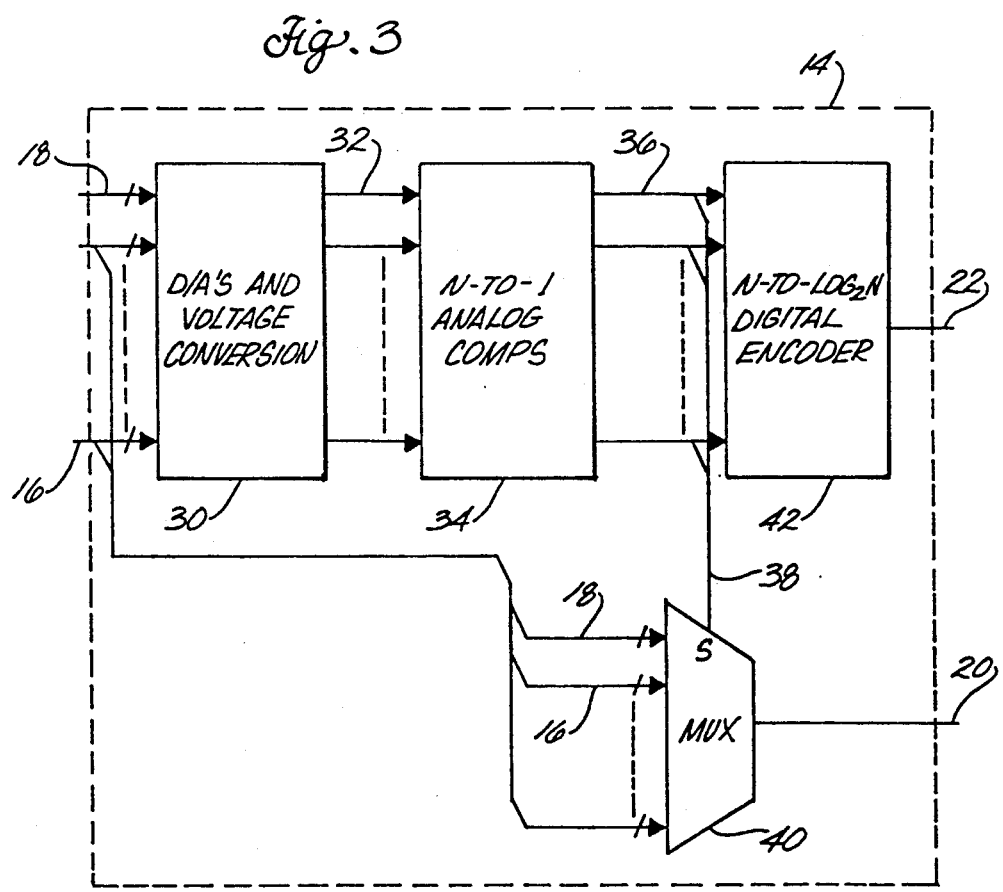

EFFICIENT HIGH SPEED N-WORD COMPARATOR

FIELD OF THE INVENTION

The present invention relates generally to circuits for comparison of a plurality of inputs. In particular, a circuit is provided which simultaneously compares inputs to minimize time delay. A plurality of digital inputs are compared using digital-to-analog conversion followed by simultaneous comparison of analog signals in a plurality of weighted analog comparators to define the largest or smallest input which is then selected through a multiplexer.

BACKGROUND OF THE INVENTION

Comparison of a plurality of digital input words has been accomplished in the prior art through the use of an iterative comparison of pairs of the input words or a binary tree configuration also known as binary decimation. Significant ripple delay is inherent in either of these two comparison methods. In the first prior art approach, the first digital word is compared with the second word and the larger (or smaller) word is selected for comparison with the third input word. This process is continued with a selection of the larger word at each step until all of the inputs have been sampled.

The second prior art approach simultaneously compares pairs of inputs selecting the larger or smaller input of each pair which is then in turn compared with the selection from the adjacent pair. This approach is demonstrated in FIG. 1 of the drawings. Implementation is accomplished by providing each pair of inputs to a digital comparator. The output of each comparator provides a selection signal for a multiplexer which also receives the input pair. The output of the multiplexer is paired with the output of a second multiplexer and provided to an additional digital comparator, the output of which selects from a second level multiplexer to transmit the selected second level choice. As can be appreciated from the four word comparator shown in FIG. 1, significant quantities of hardware are required for implementation of comparison of larger numbers of inputs.

With either of the two prior art methods, the large number of logic gates required for implementation results in high power requirements. The combination of power and size for architectures implementing these prior art methods significantly limits the number of inputs which may be compared if the comparator architecture is to be implemented monolithically. Power and size problems limit the practical comparison to about six words.

Even with monolithic implementation, the critical path delay created by the architecture requirement significantly limits the allowable bandwidth for the system in which the comparator is used. In many modern communication systems where algorithms require rapid comparison of multiple digital words, this limitation is unacceptable.

It is therefore desirable to provide a comparator for a plurality of digital input words which will simultaneously compare all of the input words for minimum delay.

SUMMARY OF THE INVENTION

The present invention provides a circuit for determining and transmitting the extremum (either largest or smallest) of a plurality of input signals. A number of analog comparators equal to the number of input signals is employed to simultaneously compare the plurality of input words. Each input signal is directed respectively to one of the comparators. A first transistor in each comparator receives the respective input signal to control a current responsive to the magnitude of the respective input signal. All of the remaining input signals are provided to the comparator through a group of identical balance transistors, each receiving one of the input signals and providing a current responsive thereto. The balance transistors are sized such that, in combination, their maximum current capacity is equal to the current capacity of the first transistor.

A means is provided in each comparator to determine if the current through the first transistor responsive to the respective input signal is larger than the combined current of the balance transistors. The circuit may be configured such that the largest or smallest signal to the plurality of inputs will result in largest current through the first transistor of the respective comparator. The outputs of the comparators provide a selection input to a multiplexer receiving the plurality of input signals. The extremum signal is then available at the output of the multiplexer.

Digital signal inputs may be accommodated by first converting each digital signal to an appropriate analog voltage which is in turn provided to the comparator. The comparator outputs may then be used to address a multiplexer receiving the digital input signals to select and transmit the extremum digital word. Identification of an input address for the selected extremum value is accomplished by providing the outputs of the analog comparators as input bits in a digital encoder. The address of the extremum value and the value itself as output on the multiplexer are then provided for further processing.

The advantageous and distinguishing features of the present invention are further described in the drawings and detailed description which follows and are recited in the appended claims.

BRIEF DESCRIPTION OF THE DRAWINGS

FIG. 2 is a block diagram schematic of a N-word compare architecture for use in a communication algorithm;

FIG. 3 is a block diagram schematic of the individual elements of the compare circuit;

DETAILED DESCRIPTION

Figure 1:
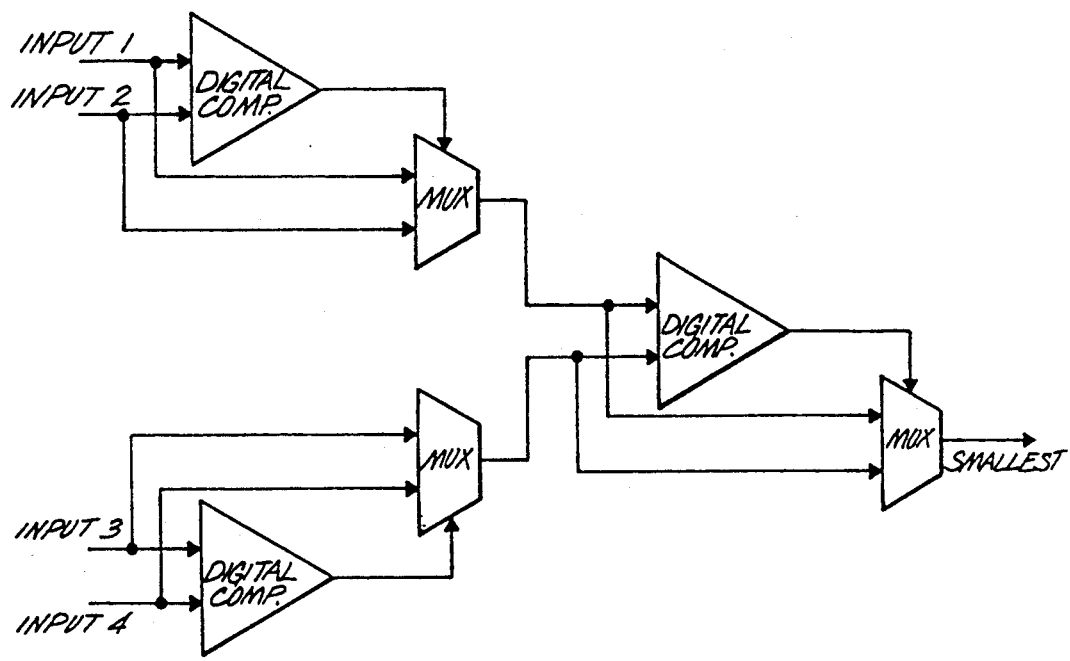
FIG. 1 is a prior art example of a four-word digital comparator employing a binary decimation technique.

The basic structure for application of the present invention is shown in FIG. 2. A plurality of inputs 10 are sampled in an input register 12. Each of the inputs comprises a digital word having multiple bits. For purposes of demonstration of a present embodiment of the invention an 8 bit word is assumed. A comparison circuit 14 receives the inputs from the input register on intermediate buses 16. In many communications applications comparison of the incoming data with the selected extremum value from the immediately previous comparison is required. The previously selected value is provided on bus 18 to the comparison circuit.

In the embodiment shown in FIG. 2 the comparison circuit evaluates N words including (N-1) inputs plus the previously selected output. The comparison circuit provides two outputs, the selected extremum value which is provided on bus 20 and the input address of the extremum value which is output on bus 22. Both outputs are captured in an output register 24 to be retrieved by other interfacing circuits on output buses 26 and 28 respectively. Bus 18 for the feedback to the comparison circuit previously described is connected through output bus 26 in the configuration shown in the drawings.

The internal elements of the comparison circuit are shown in FIG. 3. The inputs to the comparison circuit from bus 18 and the intermediate buses 16 are provided to a conversion circuit 30 which will be described in greater detail subsequently. The conversion circuit converts the digital words to analog voltage signals and provides any voltage conversion required for further processing. The signals which have now been converted to analog voltages are provided on output lines 32 to a bank of analog comparators 34. The analog comparators simultaneously compare the analog inputs as will be described in greater detail subsequently. Each comparator provides an output 36 which is a logical 1 or high signal if the corresponding analog input is the extremum value. The outputs of the analog comparators shown in FIG. 3 as signal selection bus 38 address a multiplexer 40 which serves as a means to evaluate which comparator provided the extreme value. The multiplexer receives the inputs from bus 18 and the intermediate busses 16 and based on the selection signal input transmits the extremum value on bus 20. The analog comparator outputs also comprise the input for a digital encoder 42 which encodes the extremum value of the analog comparator outputs to provide an address for the extremum value. The encoded address is then output on bus 22.

Figure 4:
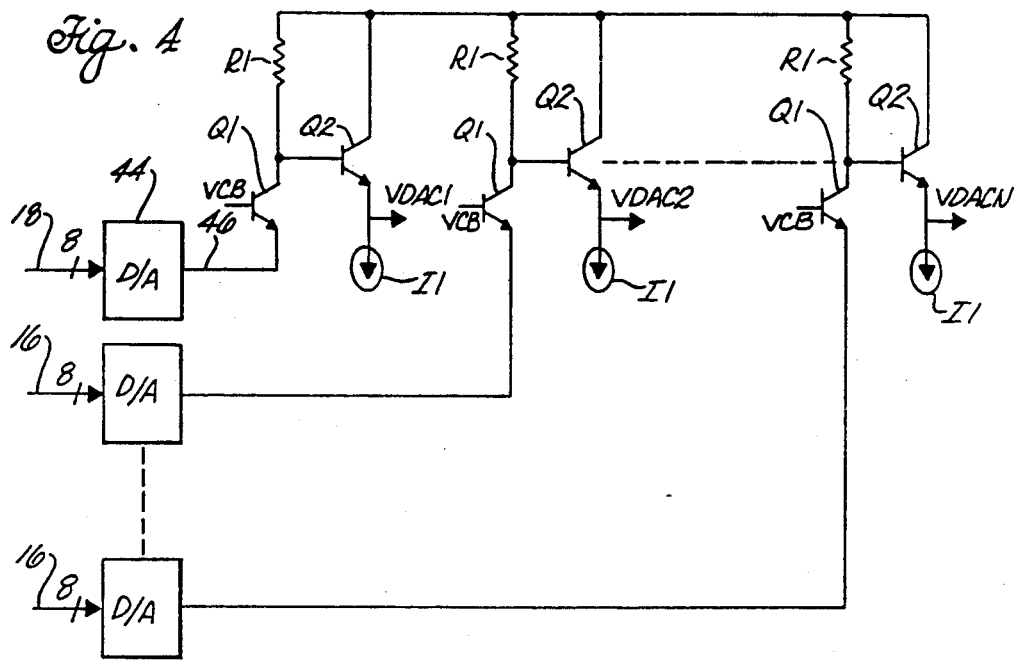
FIG. 4 is a schematic of a first embodiment of a digital to analog converter and voltage conversion element of FIG. 3.

A representative embodiment of the conversion circuit is shown in FIG. 4. The 8 bit digital words held in the input register are provided on the intermediate busses 16 while the prior extremum value is provided on bus 18 to individual digital-to-analog converters (DAC) 44. The DACs may be implemented as known to those skilled in the art using any of several techniques. Each of the DACs creates a current on output 46 based on the value of the digital word on the input. A primary function of the conversion circuit is to rapidly convert the DAC current to a low impedance voltage. This is accomplished in the embodiment shown in FIG. 4 by providing a transistor Q1 having a base input voltage VCB to act as a common base stage receiver connected to the DAC output. An emitter follower transistor Q2 is driven by the common base stage receiver to provide an output designated VDAC1, VDAC2 through VDACN respectively for each associated DAC. The common base stage receiver provides bandwidth extension while the emitter follower stage provides impedance conversion. A current to voltage conversion resistor R1 is employed to determine the quantization voltage level developed by the DAC. In the example shown for an 8 bit input word full scale swing on the DAC will be 256 times the quantization voltage. Magnitude of the full scale voltage swing may seriously affect the settling time of the DAC while size of the quantization current sets a limit on the imprecision allowable in the analog processing to be described with respect to the analog comparators. Those skilled in the art will recognize the proper selection of the value for resistor R1 and current source I1 for each DAC to achieve the proper balance of speed and accuracy.

Figure 5:
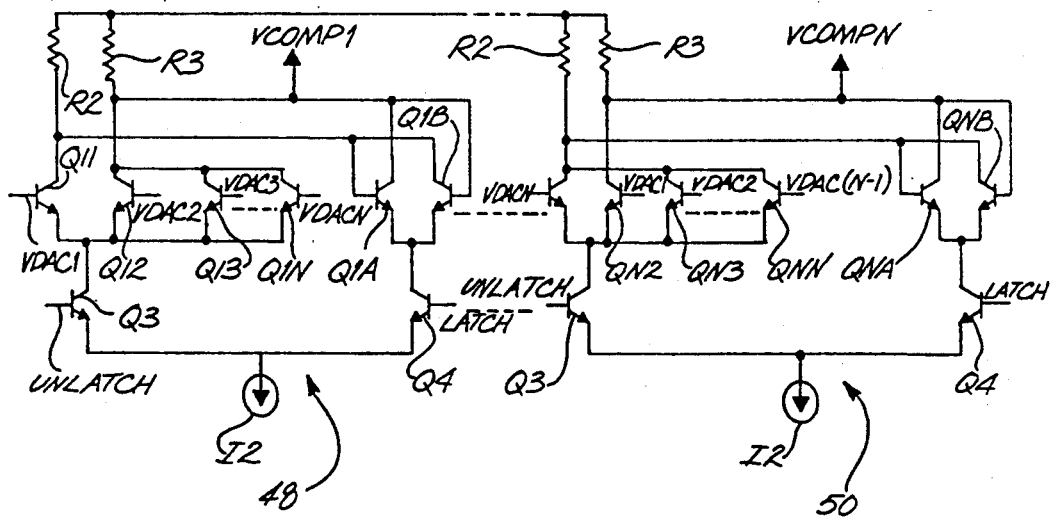
FIG. 5 is a first embodiment of a N-input analog comparator circuit from FIG. 3.

The resulting analog voltages VDAC1 through VDACN represent the digital input values for the comparison circuit. These analog voltages are provided to the analog comparators which are shown in FIG. 5. The comparators are identical in configuration and only the first and last comparator designated 48 and 50 respectively are shown in FIG. 5. Using the first comparator as an example, each comparator receives the respective analog voltage, in the case of the first comparator VDAC1 at a first comparison transistor Q11. The remaining analog voltages, again in the case of the first comparator voltages VDAC2 through VDACN, are received by a plurality of identical balance transistors Q12 through Q1N. To provide a balance and avoid offset problems the comparison transistor Q11 is sized at (N-1) times that of the remaining devices Q12 through Q1N of the individual comparator. This may be accomplished through physical sizing of the transistor or by way of providing VDAC1 to a plurality of identical transistors of the same number and having the same size as the balance transistors. The current capacity of the comparison transistor is therefore equal to the sum of the current capacities of the balance transistors.

A positive feedback latch comprising transistors Q1A and Q1B is placed across the comparison transistor Q11 and the balance transistors Q12 through Q1N. Latching transistors Q3 and Q4 on each comparator latch current through the comparison transistor and balance transistors when the UNLATCH signal is applied to Q3 and latches the respective currents through the positive feedback latch by application of the LATCH signal to transistor Q4 to determine the extremum value. Those skilled in the art will recognize that typically the UNLATCH signal is approximately the inverse of the LATCH signal. The positive feedback latch provides an output VCOMP1 which is high or low (logic level 1 or 0) based on the current drawn by the comparison transistor in relation to the current drawn by the balance transistors. Each of the comparators is identical as demonstrated by comparator 50 in FIG. 5 which receives the Nth analog signal and transistor designations are marked accordingly. Those skilled in the art will recognize proper sizing of resistors R2 and R3 and current source I2 for each of the comparators.

Resistors R2 and R3 may also be varied in size as an alternative to sizing of the comparison transistor and the balance transistors. Thermal variance problems and other design considerations may render this alternative less desirable than sizing of the transistors depending on accuracy requirements.

The comparators as described may latch in an indeterministic manner if multiple inputs have the same extremum value. This problem is circumvented in the present invention by prioritizing the comparators. This is accomplished by prioritizing at the multiplexer selection input in ascending or descending order based on address input, e.g. the Nth comparator has greater priority than the (N-1)st comparator. Physical implementation in the individual comparators is accomplished by sizing of the comparison transistor according to the chosen priority rank. In an alternative embodiment, sizing of resistors R2 and R3 is altered from comparator to comparator to provide prioritization.

VCOMP1 through VCOMPN, the outputs of the N comparators, are provided on signal lines 36 as previously described to address the multiplexer for transmission of the extremum value and to be encoded to provide the address of the extremum value.

The present invention provides significant advantage over prior art comparators by utilizing a digital to analog conversion in combination with analog comparison for rapid simultaneous evaluation of the magnitude of the inputs. Comparison speed is significantly faster than prior art binary tree decimation or iterative comparison techniques and is limited primarily by the settling time of the digital to analog converters. Implementation of the present invention may be accomplished monolithically for larger pluralities of inputs than was possible with prior art approaches.

Those skilled in the art will recognize modifications in the circuits presented to meet needs of specific embodiments. Such modifications are within the scope and intent of the present invention as defined in the following claims.

What is claimed is:

1. A circuit for determining an extremum of a plurality of analog input signals comprising:
    a plurality of comparators equal in number to the plurality of input signals, each of the comparators having a comparison transistor responsive to a respective one of the input signals to control a first current,
    a plurality of balance transistors equal in number to the plurality of analog input signals minus one, each of the plurality of balance transistors responsive to an associated one of the input signals other than the said respective one to control an associated one of a plurality of second currents, the balance transistors in combination having a current capacity equal to the comparison transistor, and
    a means for determining the larger of the first current and a sum of the plurality of second currents; and
    means connected to the determining means of each comparator for evaluating which comparator determined the first current to be larger.

2. A circuit as defined in claim 1 wherein the comparison transistor of an Nth comparator of said plurality has greater current capacity than the comparison transistor of the (N-1)st comparator thereby resolving ambiguities by substantially equal input signals.

3. A circuit as defined in claim 2 wherein the determining means comprises a positive feedback latch.

4. A circuit as defined in claim 3 wherein the positive feedback latch comprises:
    a first and second transistor pair having a base of the first transistor and a collector of the second transistor interconnected and sensing current in the comparison transistor, a collector of the first transistor and a base of the second transistor interconnected and sensing current across the balance transistors, and interconnected emitters;
    first latching means connected to the emitters for allowing current through the first and second transistors and a second latching means for allowing current to pass through the comparison transistor and balance transistors; and
    an output connected to one of the interconnected bases and collectors.

5. A circuit for determining an extreme value of a plurality of input signals comprising:
    a plurality of conversion means, each conversion means comprising one of the digital input signals and providing a respective analog voltage output,
    a plurality, equal to the plurality of conversion means of analog comparators, each analog comparator receiving the analog voltage output from a respective conversion means, and providing an output responsive to the extremum value,
    a multiplexer receiving the plurality of digital inputs and selecting one input responsive to the outputs of the analog comparators.

6. A circuit as described in claim 4 further comprising digital encoding means receiving the outputs of the analog comparators, encoding an address, and providing the address corresponding to the extremum input value responsive to the outputs of the analog comparators.

7. A circuit as described in claim 4 wherein each conversion means comprises:
    a digital to analog converter receiving the digital input signal;
    a common base stage receiver connected to the digital to analog converter; and
    an emitter follower stage driven by the common base stage receiver and having a low impedance voltage input.

8. A circuit for determining an extremum of a plurality of N input signals comprising:
    a plurality of N comparators all being identical in structure,
    such that an Ith compartor (I being an integer from 1 to N) of the plurality comprises
    a comparison current control means responsive to an Ith input signal of the plurality to control a first current,
    a plurality of N-1 balance current control means, each of the balance current control means responsive to a respective one of the remaining input signals of said plurality to control a respective second current,
    the balance current control means in combination having a current capacity equal to the current capacity of the comparison current control means, and
    a means for determining the larger of the first current and a sum of the second currents,
    wherein the Ith comparator is representative of every comparator 1 through N in the plurality; and
    means connected to the determining means of each comparator for evaluating which comparator determined the first current to be larger.

9. A circuit as defined in claim 7 in which each of the balance current control means each comprise a balance transistor and the comparison current control means comprises a transistor having a current capacity equal to a sum of the current capacities of the plurality of N-1 balance transistors.

10. A circuit as defined in claim 1 wherein each of the comparison transistors in the plurality of comparators is distinctly sized to prioritize the order in which each of the comparators operates for resolving ambiguities caused by substantially equal input signals.

* * * * *

UNITED STATES PATENT AND TRADEMARK OFFICE
CERTIFICATE OF CORRECTION

PATENT NO. : 5,130,578
DATED : July 14, 1992
INVENTOR(S) : Wade J. Stone et al.

It is certified that error appears in the above-identified patent and that said Letters Patent is hereby corrected as shown below:

Column 3, line 31, delete "extreme" and insert therefor --extremum--.

IN THE CLAIMS

Claim 5, Column 6, line 1, delete "extreme" and insert therefor --extremum--.
Column 6, line 4, delete "comprising" and insert therefor --receiving--.
Claim 8, Column 6, line 33, delete "compartor" and insert therefor --comparator--.

Signed and Sealed this

Twentieth Day of December, 1994

*Attest:*

BRUCE LEHMAN

*Attesting Officer*  *Commissioner of Patents and Trademarks*